United States Patent Office 3,813,253
Patented May 28, 1974

3,813,253
DRY MIXTURES FOR PRODUCING ACID-RESISTANT CEMENT AND MORTAR COMPOSITIONS
Helmut Neises, Kelkheim, Taunus, Germany, assignor to Farbwerke Hoechst Aktiengesellschaft vormals Meister Lucius & Bruning, Frankfurt am Main, Germany
No Drawing. Continuation of abandoned application Ser. No. 835,800, June 23, 1969. This application Oct. 1, 1971, Ser. No. 185,895
Int. Cl. C04b 19/03, 19/04
U.S. Cl. 106—84                             2 Claims

ABSTRACT OF THE DISCLOSURE

With the use of condensed aluminum phosphates as hardeners, a composition can be prepared which contains all the ingredients necessary for making acid-resistant water glass cements and mortars. The composition contains as essential ingredients an inert filler material, a water soluble alkali metal silicate and, as the hardener, an aluminum phosphate with a molar ratio of $P_2O_5:Al_2O_3=1.1$ to $3$ which has been subjected to a thermal treatment by heating it in a first stage to at most 400° C. and in a subsequent stage to at most 750° C., the heating being continued in both stages until the weight remains constant. A workable water glass cement or mortar is obtained from such compositions by simply adding water. The necessary amount of water can be reduced and the workability improved by incorporating in the composition a non-ionic or anionic surfactant. For better storability the hardener or the alkali metal silicate are advantageously hydrophobized.

---

This is a continuation of application Ser. No. 835,800, filed June 23, 1969, and now abandoned.

This invention relates to pulverulent dry mixtures for producing water glass mortar or water glass cement, which mixture contains all the necessary components, namely filler, hardener and water glass, in the required proportions and which are made ready for use simply by adding water.

For walling up, laying or joining acid-resistant building elements, for example, bricks or plates, it is known to use cements or mortars which contain a filler, a hardener, and water glass as binding agent. They are usually supplied as two-component systems, the hardener and filler constituting one component, the powder and an aqueous solution of alkali metal silicate the second component. The usual cements of this kind contain as hardeners silicofluorides or combinations of formamide and glycolide. In order that such cements should develop fully their chemical resistance and mechanical strength, the hardener and the type of water glass must be suited to each other.

Attempts have already been made to produce dry prepared mixtures from a filler, hardener and a soluble alkali metal silicate, which merely require to be mixed with water on the building site immediately before use. Such mixtures have not hitherto attained the qualities of the preferred two-component systems. They are much inferior to the latter in chemical resistance and mechanical strength. Their resistance to water has been low even after repeated acidification. Finally, sodium silicate must be used for such mixtures, because the period required for mixing them with water is too long if potassium silicate is used owing to its lower solubility in water. The need to use sodium silicate leads to a further disadvantage of known dry prepared mixtures, in that masonry and the like produced therewith cannot be exposed to acetic acid or sulphuric acid. The sodium salts of these acids are formed and, as is known, those salts contain crystal water. The resulting increase in volume leads to bursting phenomena.

The present invention provides a dry mixture for producing acid-resistant cement or mortar compositions bound with water glass, which reaches or exceeds the high chemical resistance and mechanical strength of conventional two-component systems, and at the same time possesses the advantages of the one-component system as regards its work-up.

The dry mixtures of this invention for producing acid-resistant cement or mortar compositions contain as essential constituents an inert filler, a water-soluble solid sodium silicate and as hardener a condensed aluminium phosphate having a molar ratio of $P_2O_5:Al_2O_3$ of 1.1 to 3, which has been prepared from an acid aluminium phosphate having this molar composition by heating it in a first stage at a temperature of at most 400° C. until its weight remains constant and, in a second stage, at a temperature of at most 750° C. until its weight remains constant.

The preparation of such condensed aluminium phosphates is described in German Pat. No. 1,252,835.

In order to improve the capacity of such mixtures for being stored and to reduce their sensitivity to moisture, it has been found advantageous, before preparing the mixtures, to render hydrophobic either the sodium silicate or the hardener. This can be carried out in an especially simple manner by adding to the sodium silicate or to the hardener a small amount of a mineral oil and mixing thoroughly.

The mixture of the invention should contain about 10 to 30% by weight of a solid water-soluble sodium silicate and about 3 to 10% by weight of the hardener, calculated on the weight of the mixture.

As fillers there may be used all those substances that have been used as fillers in the conventional water glass cements, thus, more especially, quartz sand and quartz powder, but there may also be used coke or graphite powder, and also titanium dioxide and heavy spar. Mixtures that can be worked up especially well are obtained when the inert filler contains 3 to 10% by weight of kaolinitic clay, calculated on the weight of the filler.

In order to obtain mixtures that can be worked up well it has also been found of advantage to incorporate with the dry mixture an anion-active or non-ionic surface-active substance. Especially preferred are non-ionic surface-active substances, and especially oxethylated polypropyl glycol ethers. The quantity of surface-active substance to be added amounts to about 0.05 to 0.3% by weight, calculated on the total weight of the mixture.

The compositions of the water-soluble sodium silicates used should be approximately between those of the following products:

A. 27% $Na_2O$         B. 18.5% $Na_2O$
   54% $SiO_2$            62.5% $SiO_2$
   19% $H_2O$             19% $H_2O$

The mixing of the components is advantageously carried out by first introducing into a mixing apparatus either the sodium silicate or the hardener together with about 1 to 3% of machine oil, calculated on the weight of the sodium silicate or hardener, and mixing thoroughly. The mixture of sodium silicate or hardener and oil is then mixed with the filler and the surface-active substance. When the mixture is homogeneous the hardener or the sodium silicate is added and the whole is mixed to complete the preparation. The fact that the sodium silicate is introduced into the mixer as the first component and the hardener as the last component, or vice versa, causes, in addition to rendering the first component hydrophobic, a spatial separation of the hardener and the alkali metal silicate. These two measures preclude the possibility of the acid hardener reacting with the alkaline sodium silicate without water being present.

In order to obtain a cement composition that can be worked up, there are added to the dry prepared mixture about 10 to 20 parts by weight of water per 100 parts by weight of mortar powder. The necessary quantity of water depends to some extent on the nature and quantity of the sodium silicate used. This can of course be determined for a particular mixture.

The following mixtures were made with the use of the sodium silicates A and B mentioned above:

1.

20.0% of sodium silicate A
0.3% of machine oil mineral oil SAE (10–30)
4.9% kaolin clay
0.1% of surface-active substance, polymerized adduct of ethylene oxide and propylene oxide (registered Trademark Genapol PF 80 of Farbwerke Hoechst AG.)
33.3% of quartz powder, particle size: 70%:<40μ, 30%:40—100μ
35.0% of quartz sand, particle size 0.1–0.6 mm.
6.4% of hardener (condensed aluminium phosphate)

2.

12.5% of sodium silicate A
0.3% of mineral oil
4.9% of kaolin clay
0.1% of surface-active substance (as 1.)
36.0% of quartz powder (as 1.)
42.2% of quartz sand 0.1–0.6 mm.
4.0% of hardener

3.

17.2% of sodium silicate B
0.3% of mineral oil
4.9% of kaolin clay
0.1% of surface-active substance (as 1)
36.0% of quart powder (as 1)
37.5% of quartz sand 0.1–0.6 mm.
4.0% of hardener The components were mixed together in the order in which they are given above. The mixtures were made into test bodies in order to determine their mechanical strength.

The experimental results are given in the following Table:

|  | Test mixture | | |
|---|---|---|---|
|  | 1 | 2 | 3 |
| Quantity of water in parts by weight per 100 parts by weight of mortar powder | 12–13 | 13–14 | 16–17 |
| Mixing period to obtain a good mortar consistency in minutes | 2–3 | 2–3 | 10–15 |
| Workable time of the mortar in hours | 2 | 2 | 1 |
| Setting time in hours | 24 | 24 | 24 |
| Compressive strength in kg./cm.³ (25 x 25 mm. test cylinder): | | | |
| After storage for 2 weeks at room temperature | 350–400 | 220–270 | 100–140 |
| After storage for 4 weeks | 470–510 | 220–270 | 110–150 |
| Adhesion strength on ceramic in kg./cm.³: | | | |
| After storage for 2 weeks at room temperature | ¹30–40 | 20–26 | 10–15 |
| After storage for 4 weeks | ¹30–45 | 23–25 | 10–15 |
| Adhesion strength on sandblasted steel in kg./cm.³: | | | |
| After 2 weeks storage at room temperature | 38–45 | 25–30 | (²) |
| After 4 weeks storage | 43–48 | 25–30 |  |
| Tensile strength in kg./cm.³: | | | |
| After 8 days storage at room temperature | 40–55 | 34–37 | 29–31 |
| After 4 weeks storage | 65–72 | 35–39 | 31–37 |

¹ Adhesion strength could not be determined owing to fractures in the ceramic brick.
² Not measured.

When the corresponding mechanical strengths of acid-proof cements containing silicofluoride and formamide as hardeners and water glass as binding agent were compared, the strength of the acid-proof cement hardened with formamide was of the order of magnitude of that of mixture 2 and the strength of the products hardened with silicofluoride were between the values of those of mixtures 2 and 3.

Test bodies (cylinders measuring 25 x 25 mm.), which had been kept for 14 days at room temperature, were subjected to boiling tests in nitric acid of 50% strength, sulphuric acid of 70% strength, hydrochloric acid of 36% strength, and concentrated NaOCl-solution of 50% strength and a saturated solution of sodium carbonate, and also in distilled water for a period of 24 hours and then repeated boiling in distilled water. The test bodies showed no reduction in strength. This fact is especially striking under the action of concentrated bleaching liquor and cold saturated sodium carbonate solution, although in this case there was a slight surface corrosion.

In the case of ordinary commercial acid-proof cements of the two-components type a decrease in strength of 50–70% after exposure to the action of acid was found. Also remarkable is the rentention of adhesion strength after being kept for several months in sulphuric acid of 70% strength at room temperature, whereas water glass cements hardened with formamide and silicofluoride suffered a reduction in adhesion strength of up to about ⅔ to ¾ of the original value. It has been surprisingly observed that, in spite of the use of sodium silicates, no bursting effects was caused by the formation of Glauber's salt resulting from the action of sulphuric acid.

The permeability according to DIN 1060 of mixtures 1 and 2 were determined. A coating 3 mm. thick of mortar having the composition of mixtures 1 and 2 was applied to frit-like, disk-shaped concrete bodies having a high permeability to water. After being allowed to stand for 14 days at room temperature, the test bodies were subjected in stages to hydrostatic pressures from 1 to 5 atmospheres (gage). In spite of this severe treatment no penetration of water through the mortar layer only 3 mm. thick could be detected. For comparison, tests were made with ordinary commercial acid-proof cements having a layer thickness of 30 mm. and water penetrated through these layers under a pressure of 1 atmosphere (gage).

The mortar powders 1 and 2 at only 12 to 14 parts by weight of water per 100 parts by weight of mortar powder gave cement compositions having a consistency that enabled ceramic tiles to be laid as a floor covering. These mortar compositions are also well suited for building walls of acid-resistant bricks and clinker. The thixotropic character of the mortar composition also enabled bricks to be laid overhead, which is very important with an arched roof.

With the mortar powder 1 there is obtained with 14 parts by weight of water per 100 parts by weight of mortar powder a plastic composition which can be very easily spread as a plaster floor composition by means of a trowel and a smoothing disk. Layers having a thickness of 2 cm. harden without the formation of shrinkage cracks. The same is true of composition 2 at 15 to 16 parts by weight of water per 100 parts by weight of mortar powder. As the consistency of the mortar can be considerably varied by slightly increasing the water content, the composition can also be spread and compacted by mechanical assistance by means of vibrators or pneumatic plasterers or by centrifuging to produce corrosion protective layers on pipes. By blending the mortar powder with quartzitic fillers of corase particle size, such as grit or quartzite chippings, it is possible to produce acid-resistant concrete of which the following is an example:

400 parts by weight of mortar powder 1,
600 parts by weight of quartzite clippings of 3–8 mm.,
68 parts by weight of water.

After being allowed to stand for three weeks in the air the composition has a compressive strength (tested on cubes measuring 7 x 7 x 7 cm.) of 210 to 260 kg./cm.² It has a bulk density of 2.36 g./cm.³. The tensile strength of this concrete mass was 40 to 45 kg./cm.², after standing for three weeks, and it increased to 60 to 65 kg./cm.² after standing for four weeks. These strengths are appreciable considering that only 8% of sodium silicate is present as binding agent. A cylindrical vessel made of this material and having a capacity of about one liter and a wall thickness of 1.5 cm. was absolutely liquid-tight after being allowed to stand for several months in sulphuric acid of 70% strength.

The mortar powders have been tested for their stability during storage over periods exceeding four months at temperatures of 20° C., 40° C. and 60° C. Storage at 20° C. and 40° C. showed no reduction in strength. The storage at 60° C. caused a reduction in strength of only about 20%.

I claim:

1. A storage stable composition of matter which, upon the addition of water, gives a self-hardening, acid resistant water glass cement, said composition containing as essential ingredients at least one inert filler, a water soluble alkali metal silicate, and as a hardener a condensed aluminum phosphate which has been obtained by heating an aluminum phosphate with a molar ratio of $$P_2O_5:Al_2O_3 = 1.1 \text{ to } 3$$

in a first stage to at most 400° C. until the weight remains constant and in a second stage to at most 750° C. again until the weight remains constant and wherein said composition contains from about 10 to about 30% by weight of a solid, water soluble sodium silicate and from about 3 to about 10% by weight of the hardener.

2. The composition as defined in claim 1 in which 3 to 10% by weight of an inert filler is kaolinitic clay which is added as additive for the self-hardening water glass cement, said percentage being calculated on the total weight of the filler.

References Cited

UNITED STATES PATENTS

| | | | |
|---|---|---|---|
| 3,445,257 | 5/1969 | Hloch et al. | 106—84 |
| 3,656,977 | 4/1972 | Dreyling et al. | 106—84 |
| 3,333,973 | 8/1967 | Freiman | 106—84 |
| 3,364,065 | 1/1968 | Cutright | 106—84 |

JAMES E. POER, Primary Examiner